(12) United States Patent
Wellman et al.

(10) Patent No.: US 8,880,446 B2
(45) Date of Patent: Nov. 4, 2014

(54) PREDICTIVE ANALYTICS FACTORY

(71) Applicant: CloudVu, Inc., Sandy, UT (US)

(72) Inventors: Richard W. Wellman, Park City, UT (US); Kelly D. Phillipps, Salt Lake City, UT (US)

(73) Assignee: PurePredictive, Inc., Sandy, UT (US)

( * ) Notice: Subject to any disclaimer, the term of this patent is extended or adjusted under 35 U.S.C. 154(b) by 0 days.

(21) Appl. No.: 13/870,861

(22) Filed: Apr. 25, 2013

(65) Prior Publication Data

US 2014/0136452 A1 May 15, 2014

Related U.S. Application Data

(60) Provisional application No. 61/727,114, filed on Nov. 15, 2012.

(51) Int. Cl.
  *G06N 99/00* (2010.01)

(52) U.S. Cl.
  CPC .................................. *G06N 99/005* (2013.01)
  USPC .......................................................... 706/12

(58) Field of Classification Search
  USPC .......................................................... 706/12
  See application file for complete search history.

(56) References Cited

U.S. PATENT DOCUMENTS

| | | | |
|---|---|---|---|
| 6,112,304 A | 8/2000 | Clawson | |
| 6,507,726 B1 | 1/2003 | Atkinson et al. | |
| 6,523,015 B1 | 2/2003 | Bera et al. | |
| 7,219,085 B2 | 5/2007 | Buck et al. | |
| 7,689,520 B2 | 3/2010 | Burges et al. | |
| 7,814,194 B2 | 10/2010 | Hellerstein et al. | |
| 8,160,981 B2 | 4/2012 | Aparicio | |
| 8,209,271 B1 * | 6/2012 | Lin et al. | 706/12 |
| 8,209,274 B1 * | 6/2012 | Lin et al. | 706/21 |
| 8,214,308 B2 * | 7/2012 | Chu | 706/14 |
| 8,229,864 B1 * | 7/2012 | Lin et al. | 706/11 |
| 8,250,009 B1 * | 8/2012 | Breckenridge et al. | 706/14 |
| 8,311,967 B1 * | 11/2012 | Lin et al. | 706/45 |
| 8,370,279 B1 * | 2/2013 | Lin et al. | 706/12 |
| 8,370,280 B1 * | 2/2013 | Lin et al. | 706/12 |
| 8,527,324 B2 * | 9/2013 | Richter | 705/7.38 |
| 2004/0059966 A1 | 3/2004 | Chan et al. | |

(Continued)

FOREIGN PATENT DOCUMENTS

| | | |
|---|---|---|
| DE | 102010046439 | 3/2012 |
| WO | 2012151198 | 11/2012 |

OTHER PUBLICATIONS

J. Zico Kolter, et al., "Dynamic Weighted Majority: An Ensemble Method for Drifting Concepts", Journal of Machine Learning Research 8 (2007), pp. 2755-2790.*

(Continued)

*Primary Examiner* — Kakalo Chaki
*Assistant Examiner* — Fuming Wu
(74) *Attorney, Agent, or Firm* — Kunzler Law Group, PC

(57) ABSTRACT

An apparatus, system, method, and computer program product are disclosed for a predictive analytics factory. A receiver module is configured to receive training data. A function generator module is configured to determine a plurality of learned functions from multiple classes based on the training data. A predictive compiler module is configured to form a predictive ensemble comprising a subset of learned functions from the plurality of learned functions. The subset of learned functions is from at least two of the multiple classes.

25 Claims, 8 Drawing Sheets

(56) References Cited

U.S. PATENT DOCUMENTS

| | | |
|---|---|---|
| 2005/0132052 A1 | 6/2005 | Uttamchandani et al. |
| 2005/0228789 A1 | 10/2005 | Fawcett et al. |
| 2007/0111179 A1 | 5/2007 | Hochwarth et al. |
| 2008/0162487 A1* | 7/2008 | Richter .................. 707/10 |
| 2009/0035733 A1 | 2/2009 | Meitar et al. |
| 2009/0186329 A1 | 7/2009 | Connor |
| 2009/0254379 A1* | 10/2009 | Adams et al. ................ 705/4 |
| 2009/0327172 A1 | 12/2009 | Liu et al. |
| 2010/0009330 A1 | 1/2010 | Yaskin |
| 2010/0114663 A1* | 5/2010 | Casas et al. ................ 705/10 |
| 2010/0131314 A1 | 5/2010 | Ting et al. |
| 2010/0223212 A1* | 9/2010 | Manolescu et al. ........... 706/12 |
| 2010/0306141 A1 | 12/2010 | Chidlovskii |
| 2011/0111384 A1 | 5/2011 | Dietrich et al. |
| 2011/0119300 A1 | 5/2011 | Marcade |
| 2011/0137672 A1* | 6/2011 | Adams et al. ................ 705/2 |
| 2012/0004893 A1* | 1/2012 | Vaidyanathan et al. ........ 703/11 |
| 2012/0030160 A1* | 2/2012 | Ratnam et al. ................ 706/47 |
| 2012/0158620 A1 | 6/2012 | Paquet et al. |
| 2012/0158624 A1* | 6/2012 | Lingenfelder et al. ......... 706/12 |
| 2012/0191630 A1* | 7/2012 | Breckenridge et al. ........ 706/12 |
| 2012/0191631 A1* | 7/2012 | Breckenridge et al. ........ 706/12 |
| 2012/0284212 A1* | 11/2012 | Lin et al. .................. 706/12 |
| 2012/0284213 A1* | 11/2012 | Lin et al. .................. 706/12 |
| 2012/0284600 A1* | 11/2012 | Lin et al. .................. 715/212 |
| 2013/0004930 A1 | 1/2013 | Sorenson et al. |
| 2014/0136452 A1* | 5/2014 | Wellman et al. ............. 706/12 |

OTHER PUBLICATIONS

Bennett, "EHRs connect research and practice:Where predictive modeling,artificial intelligence,and clinical decision support intersect," Health Policy and Technology (2012) 1, 105-114; Available online Apr. 18, 2012.*

Kolter, "DynamicWeighted Majority: An Ensemble Method for Drifting Concepts," Journal of Machine Learning Research 8 (2007) 2755-2790.*

McTigue, Jake, "Predictive Analytics for IT", InformationWeek Reports, Mar. 2012, pp. 17, Reports. InformationWeek.com.

Purpura, Stephen, "Statistically Adaptive Learning for a General Class of Cost Functions (SA L-BFGS)", Sep. 5, 2012, pp. 7, arXiv:1209.0029v3 [cs.LG] Sep. 5, 2012.

Application No. PCT/US2013/077236, 3128.2.2pct, International Search Report and Written Opinion, Feb. 24, 2014.

Application No. PCT/US2013/070358, 3128.2.1pct, International Search Report and Written Opinion, Feb. 28, 2014.

Application No. PCT/US2014/013028, 3128.2.3pct, International Search Report and Written Opinion, May 15, 2014.

U.S. Appl. No. 13/749,618, Office Action, Jul. 8, 2014.

Application No. PCT/US14/10729, International Search Report and Written Opinion, Aug. 28, 2014.

* cited by examiner

PREDICTIVE ANALYTICS FACTORY

CROSS-REFERENCES TO RELATED APPLICATIONS

This application claims the benefit of U.S. Provisional Patent Application No. 61/727,114 entitled "PREDICTIVE ANALYTICS FACTORY" and filed on Nov. 15, 2012 for Richard W. Wellman, et al., which is incorporated herein by reference.

TECHNICAL FIELD

The present disclosure, in various embodiments, relates to analytics and more particularly relates to an automated factory for predictive analytics.

BACKGROUND

Data analytics models are typically highly tuned and customized for a particular application. Such tuning and customization often requires pre-existing knowledge about the particular application, and can require the use of complex manual tools to achieve this tuning and customization. For example, an expert in a certain field may carefully tune and customize an analytics model for use in the expert's field using a manual tool.

While a highly tuned, expert customized analytics model may be useful for a particular application or field, because of the high level of tuning and customization, the analytics model is typically useless or at least inaccurate for other applications and fields. Conversely, a general purpose analytics framework typically is not specialized enough for most applications without substantial customization.

SUMMARY

From the foregoing discussion, it should be apparent that a need exists for an apparatus, system, method, and computer program product to generate a predictive ensemble in an automated manner. Beneficially, such an apparatus, system, method, and computer program product would comprise a predictive analytics factory configured to generate a predictive ensemble regardless of the particular field or application, with little or no input from a user or expert.

The present disclosure has been developed in response to the present state of the art, and in particular, in response to the problems and needs in the art that have not yet been fully solved by currently available analytics methods. Accordingly, the present disclosure has been developed to provide an apparatus, system, method, and computer program product for a predictive analytics factory that overcome many or all of the above-discussed shortcomings in the art.

Apparatuses are presented for a predictive analytics factory. In one embodiment, a receiver module is configured to receive training data. A function generator module, in certain embodiments, is configured to determine a plurality of learned functions from multiple classes based on the training data. A predictive compiler module, in a further embodiment, is configured to form a predictive ensemble comprising a subset of learned functions from the plurality of learned functions. In one embodiment, the subset of learned functions is from at least two of the multiple classes.

Methods are presented for a predictive analytics factory. In one embodiment, a method includes pseudo-randomly generating a plurality of learned functions based on training data without prior knowledge regarding suitability of the generated learned functions for the training data. A method, in another embodiment, includes evaluating a plurality of learned functions using test data to generate evaluation metadata. In another embodiment, a method includes forming a predictive ensemble comprising a subset of learned functions from a plurality of learned functions, where the subset of learned functions are selected based on evaluation metadata.

Computer program products are presented, comprising a computer readable storage medium storing computer usable program code executable to perform operations for a predictive analytics factory. In one embodiment, an operation includes determining a plurality of learned functions using training data comprising a plurality of features. An operation, in another embodiment, includes selecting a subset of features of training data based on evaluation metadata generated for a plurality of learned functions. In a further embodiment, an operation includes forming a predictive ensemble comprising at least two learned functions from a plurality of learned functions that use a selected subset of features.

A predictive analytics ensemble is presented. In one embodiment, a predictive analytics ensemble includes a plurality of learned functions synthesized from a larger plurality of learned functions. In a further embodiment, a predictive analytics ensemble includes a metadata rule set synthesized from evaluation metadata for a plurality of learned functions. A predictive analytics ensemble, in another embodiment, includes an orchestration module configured to direct data through a plurality of learned functions based on a synthesized metadata rule set to produce a result.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. The disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1:
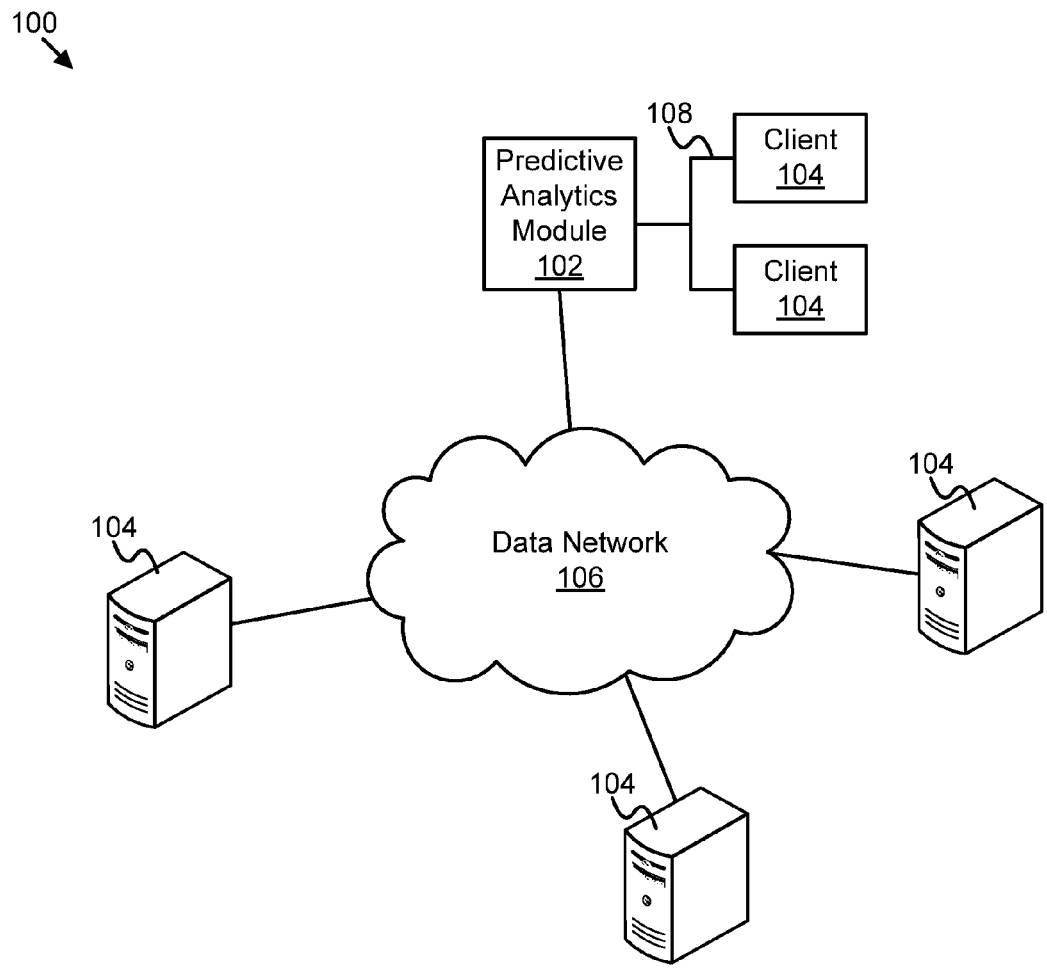
FIG. 1 is a schematic block diagram illustrating one embodiment of a system for a predictive analytics factory.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

FIG. 1 depicts one embodiment of a system 100 for a predictive analytics factory. The system 100, in the depicted embodiment, includes a predictive analytics module 102 that is in communication with several clients 104 over a data network 106, and with several clients 104 over a local channel 108, such as a system bus, an application programming interface (API), or the like. A client 104 may comprise a software application, a user, a hardware computing device with a processor and memory, or another entity in communication with the predictive analytics module 102. In general, the predictive analytics module 102 generates predictive ensembles for the clients 104. In certain embodiments, the predictive analytics module 102 provides a predictive analytics framework allowing clients 104 to request predictive ensembles, to make analysis requests, and to receive predictive results, such as a classification, a confidence metric, an inferred function, a regression function, an answer, a prediction, a recognized pattern, a rule, a recommendation, or other results.

Predictive analytics is the study of past performance, or patterns, found in historical and transactional data to identify behavior and trends in future events. This may be accomplished using a variety of statistical techniques including modeling, machine learning, data mining, or the like.

One term for large, complex, historical data sets is Big Data. Examples of Big Data include web logs, social networks, blogs, system log files, call logs, customer data, user feedback, or the like. These data sets may often be so large and complex that they are awkward and difficult to work with using traditional tools. With technological advances in computing resources, including memory, storage, and computational power, along with frameworks and programming models for data-intensive distributed applications, the ability to collect, analyze and mine these huge repositories of structured, unstructured, and/or semi-structured data has only recently become possible.

In certain embodiments, prediction may be applied through at least two general techniques: Regression and Classification.

Regression models attempt to fit a mathematical equation to approximate the relationship between the variables being analyzed. These models may include "Discrete Choice" models such as Logistic Regression, Multinomial Logistic Regression, Probit Regression, or the like. When factoring in time, Time Series models may be used, such as Auto Regression—AR, Moving Average—MA, ARMA, AR Conditional Heteroskedasticity—ARCH, Generalized ARCH—GARCH and Vector AR—VAR). Other models include Survival or Duration analysis, Classification and Regression Trees (CART), Multivariate Adaptive Regression Splines (MARS), and the like.

Classification is a form of artificial intelligence that uses computational power to execute complex algorithms in an effort to emulate human cognition. One underlying problem, however, remains: determining the set of all possible behaviors given all possible inputs is much too large to be included in a set of observed examples. Classification methods may include Neural Networks, Radial Basis Functions, Support Vector Machines, Naïve Bayes, k-Nearest Neighbors, Geospatial Predictive modeling, and the like.

Each of these forms of modeling make assumptions about the data set and model the given data, however, some models are more accurate than others and none of the models are ideal. Historically, using predictive analytics tools was a cumbersome and difficult process, often involving the engagement of a Data Scientist or other expert. Any easier-to-use tools or interfaces for general business users, however, typically fall short in that they still require "heavy lifting" by IT personnel in order to present and massage data and results. A Data Scientist typically must determine the optimal class of learning machines that would be the most applicable for a given data set, and rigorously test the selected hypothesis by first fine-tuning the learning machine parameters and second by evaluating results fed by trained data.

The predictive analytics module 102, in certain embodiments, generates predictive ensembles for the clients 104, with little or no input from a Data Scientist or other expert, by generating a large number of learned functions from multiple different classes, evaluating, combining, and/or extending the learned functions, synthesizing selected learned functions, and organizing the synthesized learned functions into a predictive ensemble. The predictive analytics module 102, in one embodiment, services analysis requests for the clients 104 using the generated predictive ensembles.

By generating a large number of learned functions, without regard to the effectiveness of the generated learned functions, without prior knowledge of the generated learned functions suitability, or the like, and evaluating the generated learned functions, in certain embodiments, the predictive analytics module 102 may provide predictive ensembles that are customized and finely tuned for data from a specific client 104, without excessive intervention or fine-tuning. The predictive analytics module 102, in a further embodiment, may generate and evaluate a large number of learned functions using parallel computing on multiple processors, such as a massively parallel processing (MPP) system or the like.

The predictive analytics module 102 may service predictive analytics requests to clients 104 locally, executing on the same host computing device as the predictive analytics module 102, by providing an API to clients 104, receiving function calls from clients 104, providing a hardware command interface to clients 104, or otherwise providing a local channel 108 to clients 104. In a further embodiment, the predictive analytics module 102 may service predictive analytics requests to clients 104 over a data network 106, such as a local area network (LAN), a wide area network (WAN) such as the Internet as a cloud service, a wireless network, a wired network, or another data network 106.

Figure 2:
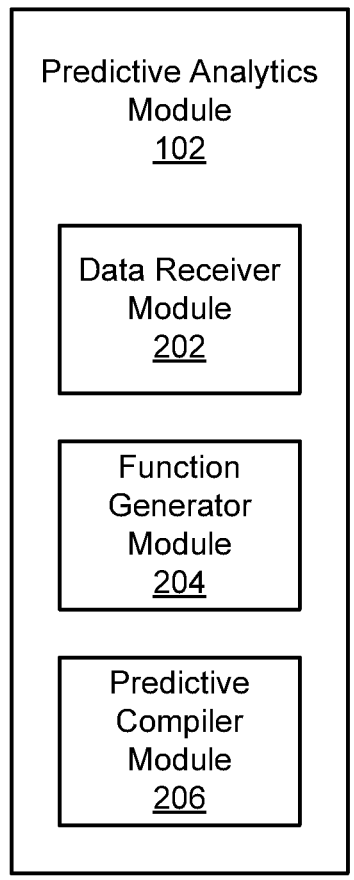
FIG. 2 is a schematic block diagram illustrating one embodiment of a predictive analytics module.

FIG. 2 depicts one embodiment of a predictive analytics module 102. The predictive analytics module 102 of FIG. 2, in certain embodiments, may be substantially similar to the predictive analytics module 102 described above with regard to FIG. 1. In the depicted embodiment, the predictive analytics module 102 includes a data receiver module 202, a function generator module 204, and a predictive compiler module 206.

The data receiver module 202, in certain embodiments, is configured to receive client data, such as training data, test data, workload data, or the like, from a client 104, either directly or indirectly. The data receiver module 202, in various embodiments, may receive data over a local channel 108 such as an API, a shared library, a hardware command interface, or the like; over a data network 106 such as wired or wireless LAN, WAN, the Internet, a serial connection, a parallel connection, or the like. In certain embodiments, the data receiver module 202 may receive data indirectly from a client 104 through an intermediate module that may pre-process, reformat, or otherwise prepare the data for the predictive analysis module 102. The data receiver module 202 may support structured data, unstructured data, semi-structured data, or the like.

One type of data that the data receiver module 202 may receive, as part of a new ensemble request or the like, is initialization data. The predictive analytics module 102, in certain embodiments, may use initialization data to train and test learned functions from which the predictive analytics module 102 may build a predictive ensemble. Initialization data may comprise historical data, statistics, Big Data, customer data, marketing data, computer system logs, computer application logs, data networking logs, or other data that a client 104 provides to the data receiver module 202 with which to build, initialize, train, and/or test a predictive ensemble.

Another type of data that the data receiver module 202 may receive, as part of an analysis request or the like, is workload data. The predictive analytics module 102, in certain embodiments, may process workload data using a predictive ensemble to obtain a result, such as a classification, a confidence metric, an inferred function, a regression function, an answer, a prediction, a recognized pattern, a rule, a recommendation, or the like. Workload data for a specific predictive ensemble, in one embodiment, has substantially the same format as the initialization data used to train and/or evaluate the predictive ensemble. For example, initialization data and/or workload data may include one or more features. As used herein, a feature may comprise a column, category, data type, attribute, characteristic, label, or other grouping of data. For example, in embodiments where initialization data and/or workload data that is organized in a table format, a column of data may be a feature. Initialization data and/or workload data may include one or more instances of the associated features. In a table format, where columns of data are associated with features, a row of data is an instance.

As described below with regard to FIG. 4, in one embodiment, the data receiver module 202 may maintain client data, such as initialization data and/or workload data, in a data repository 406, where the function generator module 204, the predictive compiler module 206, or the like may access the data. In certain embodiments, as described below, the function generator module 204 and/or the predictive compiler module 206 may divide initialization data into subsets, using certain subsets of data as training data for generating and training learned functions and using certain subsets of data as test data for evaluating generated learned functions.

The function generator module 204, in certain embodiments, is configured to generate a plurality of learned functions based on training data from the data receiver module 202. A learned function, as used herein, comprises a computer readable code that accepts an input and provides a result. A learned function may comprise a compiled code, a script, text, a data structure, a file, a function, or the like. In certain embodiments, a learned function may accept instances of one or more features as input, and provide a result, such as a classification, a confidence metric, an inferred function, a regression function, an answer, a prediction, a recognized pattern, a rule, a recommendation, or the like. In another embodiment, certain learned functions may accept instances of one or more features as input, and provide a subset of the instances, a subset of the one or more features, or the like as an output. In a further embodiment, certain learned functions may receive the output or result of one or more other learned functions as input, such as a Bayes classifier, a Boltzmann machine, or the like.

The function generator module 204 may generate learned functions from multiple different predictive analytics classes, models, or algorithms. For example, the function generator module 204 may generate decision trees; decision forests; kernel classifiers and regression machines with a plurality of reproducing kernels; non-kernel regression and classification machines such as logistic, CART, multi-layer neural nets with various topologies; Bayesian-type classifiers such as Naïve Bayes and Boltzmann machines; logistic regression; multinomial logistic regression; probit regression; AR; MA; ARMA; ARCH; GARCH; VAR; survival or duration analysis; MARS; radial basis functions; support vector machines; k-nearest neighbors; geospatial predictive modeling; and/or other classes of learned functions.

In one embodiment, the function generator module 204 generates learned functions pseudo-randomly, without regard to the effectiveness of the generated learned functions, without prior knowledge regarding the suitability of the generated learned functions for the associated training data, or the like. For example, the function generator module 204 may generate a total number of learned functions that is large enough that at least a subset of the generated learned functions are statistically likely to be effective. As used herein, pseudo-randomly indicates that the function generator module 204 is configured to generate learned functions in an automated manner, without input or selection of learned functions, predictive analytics classes or models for the learned functions, or the like by a Data Scientist, expert, or other user.

The function generator module 204, in certain embodiments, generates as many learned functions as possible for a requested predictive ensemble, given one or more parameters or limitations. A client 104 may provide a parameter or limitation for learned function generation as part of a new ensemble request or the like to an interface module 402 as described below with regard to FIG. 4, such as an amount of time; an allocation of system resources such as a number of processor nodes or cores, or an amount of volatile memory; a number of learned functions; runtime constraints on the requested ensemble such as an indicator of whether or not the requested ensemble should provide results in real-time; and/or another parameter or limitation from a client 104.

The number of learned functions that the function generator module 204 may generate for building a predictive ensemble may also be limited by capabilities of the system 100, such as a number of available processors or processor cores, a current load on the system 100, a price of remote processing resources over the data network 106; or other hardware capabilities of the system 100 available to the function generator module 204. The function generator module 204 may balance the hardware capabilities of the system 100 with an amount of time available for generating learned functions and building a predictive ensemble to determine how many learned functions to generate for the predictive ensemble.

In one embodiment, the function generator module 204 may generate at least 50 learned functions for a predictive ensemble. In a further embodiment, the function generator module 204 may generate hundreds, thousands, or millions of learned functions, or more, for a predictive ensemble. By generating an unusually large number of learned functions from different classes without regard to the suitability or effectiveness of the generated learned functions for training data, in certain embodiments, the function generator module 204 ensures that at least a subset of the generated learned functions, either individually or in combination, are useful, suitable, and/or effective for the training data without careful curation and fine tuning by a Data Scientist or other expert.

Similarly, by generating learned functions from different predictive analytics classes without regard to the effectiveness or the suitability of the different predictive analytics classes for training data, the function generator module 204, in certain embodiments, may generate learned functions that are useful, suitable, and/or effective for the training data due to the sheer amount of learned functions generated from the different predictive analytics classes. This brute force, trial-and-error approach to generating learned functions, in certain embodiments, eliminates or minimizes the role of a Data Scientist or other expert in generation of a predictive ensemble.

The function generator module 204, in certain embodiments, divides initialization data from the data receiver module 202 into various subsets of training data, and may use different training data subsets, different combinations of multiple training data subsets, or the like to generate different learned functions. The function generator module 204 may divide the initialization data into training data subsets by feature, by instance, or both. For example, a training data subset may comprise a subset of features of initialization data, a subset of features of initialization data, a subset of both features and instances of initialization data, or the like. Varying the features and/or instances used to train different learned functions, in certain embodiments, may further increase the likelihood that at least a subset of the generated learned functions are useful, suitable, and/or effective. In a further embodiment, the function generator module 204 ensures that the available initialization data is not used in its entirety as training data for any one learned function, so that at least a portion of the initialization data is available for each learned function as test data, which is described in greater detail below with regard to the function evaluator module 312 of FIG. 3.

In one embodiment, the function generator module 204 may also generate additional learned functions in cooperation with the predictive compiler module 206. The function generator module 204 may provide a learned function request interface, allowing the predictive compiler module 206 or another module, a client 104, or the like to send a learned function request to the function generator module 204 requesting that the function generator module 204 generate one or more additional learned functions. In one embodiment, a learned function request may include one or more attributes for the requested one or more learned functions. For example, a learned function request, in various embodiments, may include a predictive analytics class for a requested learned function, one or more features for a requested learned function, instances from initialization data to use as training data for a requested learned function, runtime constraints on a requested learned function, or the like. In another embodiment, a learned function request may identify initialization data, training data, or the like for one or more requested learned functions and the function generator module 204 may generate the one or more learned functions pseudo-randomly, as described above, based on the identified data.

The predictive compiler module 206, in one embodiment, is configured to form a predictive ensemble using learned functions from the function generator module 204. As used herein, a predictive ensemble comprises an organized set of a plurality of learned functions. Providing a classification, a confidence metric, an inferred function, a regression function, an answer, a prediction, a recognized pattern, a rule, a recommendation, or another result using a predictive ensemble, in certain embodiments, may be more accurate than using a single learned function.

The predictive compiler module 206 is described in greater detail below with regard to FIG. 3. The predictive compiler module 206, in certain embodiments, may combine and/or extend learned functions to form new learned functions, may request additional learned functions from the function generator module 204, or the like for inclusion in a predictive ensemble. In one embodiment, the predictive compiler module 206 evaluates learned functions from the function generator module 204 using test data to generate evaluation metadata. The predictive compiler module 206, in a further embodiment, may evaluate combined learned functions, extended learned functions, combined-extended learned functions, additional learned functions, or the like using test data to generate evaluation metadata.

The predictive compiler module 206, in certain embodiments, maintains evaluation metadata in a metadata library 314, as described below with regard to FIGS. 3 and 4. The predictive compiler module 206 may select learned functions (e.g. learned functions from the function generator module 204, combined learned functions, extended learned functions, learned functions from different predictive analytics classes, and/or combined-extended learned functions) for inclusion in a predictive ensemble based on the evaluation metadata. In a further embodiment, the predictive compiler module 206 may synthesize the selected learned functions into a final, synthesized function or function set for a predictive ensemble based on evaluation metadata. The predictive compiler module 206, in another embodiment, may include synthesized evaluation metadata in a predictive ensemble for directing data through the predictive ensemble or the like.

Figure 3:
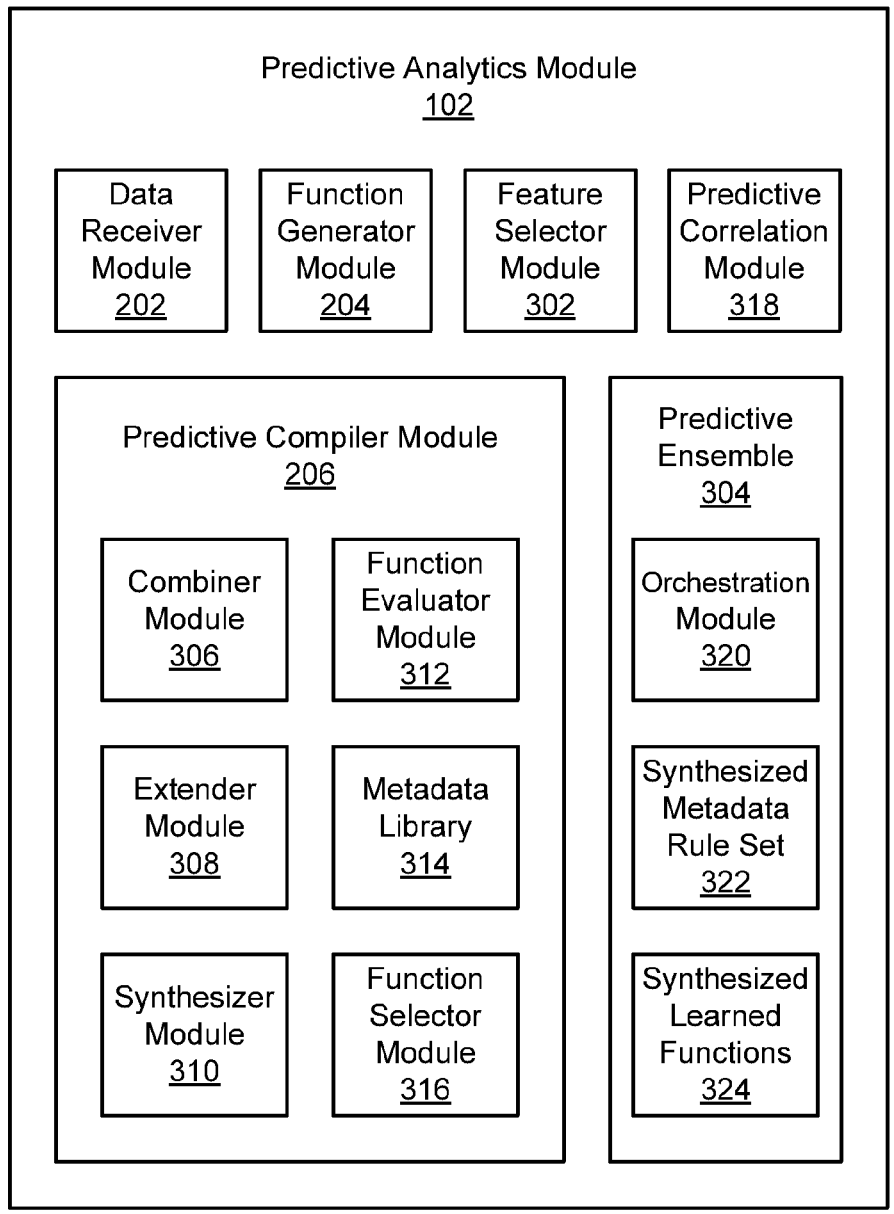
FIG. 3 is a schematic block diagram illustrating another embodiment of a predictive analytics module.

FIG. 3 depicts another embodiment of a predictive analytics module 102. The predictive analytics module 102 of FIG. 3, in certain embodiments, may be substantially similar to the predictive analytics module 102 described above with regard to FIGS. 1 and 2. In the depicted embodiment, the predictive analytics module 102 includes the data receiver module 202, the function generator module 204, and the predictive compiler module 206 described above with regard to FIG. 2 and further includes a feature selector module 302 a predictive correlation module 318, and a predictive ensemble 304. The predictive compiler module 206, in the depicted embodiment, includes a combiner module 306, an extender module 308, a synthesizer module 310, a function evaluator module 312, a metadata library 314, and a function selector module 316. The predictive ensemble 304, in the depicted embodiment, includes an orchestration module 320, a synthesized metadata rule set 322, and synthesized learned functions 324.

In one embodiment, the feature selector module 302 determines which features of initialization data to use in the predictive ensemble 304, and in the associated learned functions, and/or which features of the initialization data to exclude from the predictive ensemble 304, and from the associated learned functions. As described above, initialization data, and the training data and test data derived from the initialization data, may include one or more features. Learned functions and the predictive ensembles 304 that they form are configured to receive and process instances of one or more features. Certain features may be more predictive than others, and the more features that the predictive compiler module 206 processes and includes in the generated predictive ensemble 304, the more processing overhead used by the predictive compiler module 206, and the more complex the generated predictive ensemble 304 becomes. Additionally, certain features may not contribute to the effectiveness or accuracy of the results from a predictive ensemble 304, but may simply add noise to the results.

The feature selector module 302, in one embodiment, cooperates with the function generator module 204 and the predictive compiler module 206 to evaluate the effectiveness of various features, based on evaluation metadata from the metadata library 314 described below. For example, the function generator module 204 may generate a plurality of learned functions for various combinations of features, and the predictive compiler module 206 may evaluate the learned functions and generate evaluation metadata. Based on the evaluation metadata, the feature selector module 302 may select a subset of features that are most accurate or effective, and the predictive compiler module 206 may use learned functions that utilize the selected features to build the predictive ensemble 304. The feature selector module 302 may select features for use in the predictive ensemble 304 based on evaluation metadata for learned functions from the function generator module 204, combined learned functions from the combiner module 306, extended learned functions from the extender module 308, combined extended functions, synthesized learned functions from the synthesizer module 310, or the like.

In a further embodiment, the feature selector module 302 may cooperate with the predictive compiler module 206 to build a plurality of different predictive ensembles 304 for the same initialization data or training data, each different predictive ensemble 304 utilizing different features of the initialization data or training data. The predictive compiler module 206 may evaluate each different predictive ensemble 304, using the function evaluator module 312 described below, and the feature selector module 302 may select the predictive ensemble 304 and the associated features which are most accurate or effective based on the evaluation metadata for the different predictive ensembles 304. In certain embodiments, the predictive compiler module 206 may generate tens, hundreds, thousands, millions, or more different predictive ensembles 304 so that the feature selector module 302 may select an optimal set of features (e.g. the most accurate, most effective, or the like) with little or no input from a Data Scientist, expert, or other user in the selection process.

In one embodiment, the predictive compiler module 206 may generate a predictive ensemble 304 for each possible combination of features from which the feature selector module 302 may select. In a further embodiment, the predictive compiler module 206 may begin generating predictive ensembles 304 with a minimal number of features, and may iteratively increase the number of features used to generate predictive ensembles 304 until an increase in effectiveness or usefulness of the results of the generated predictive ensembles 304 fails to satisfy a feature effectiveness threshold. By increasing the number of features until the increases stop being effective, in certain embodiments, the predictive compiler module 206 may determine a minimum effective set of features for use in a predictive ensemble 304, so that generation and use of the predictive ensemble 304 is both effective and efficient. The feature effectiveness threshold may be predetermined or hard coded, may be selected by a client 104 as part of a new ensemble request or the like, may be based on one or more parameters or limitations, or the like.

During the iterative process, in certain embodiments, once the feature selector module 302 determines that a feature is merely introducing noise, the predictive compiler module 206 excludes the feature from future iterations, and from the predictive ensemble 304. In one embodiment, a client 104 may identify one or more features as required for the predictive ensemble 304, in a new ensemble request or the like. The feature selector module 302 may include the required features in the predictive ensemble 304, and select one or more of the remaining optional features for inclusion in the predictive ensemble 304 with the required features.

In a further embodiment, based on evaluation metadata from the metadata library 314, the feature selector module 302 determines which features from initialization data and/or training data are adding noise, are not predictive, are the least effective, or the like, and excludes the features from the predictive ensemble 304. In other embodiments, the feature selector module 302 may determine which features enhance the quality of results, increase effectiveness, or the like, and selects the features for the predictive ensemble 304.

In one embodiment, the feature selector module 302 causes the predictive compiler module 206 to repeat generating, combining, extending, and/or evaluating learned functions while iterating through permutations of feature sets. At each iteration, the function evaluator module 312 may determine an overall effectiveness of the learned functions in aggregate for the current iteration's selected combination of features. Once the feature selector module 302 identifies a feature as noise introducing, the feature selector module may exclude the noisy feature and the predictive compiler module 206 may generate a predictive ensemble 304 without the excluded feature. In one embodiment, the predictive correlation module 318 determines one or more features, instances of features, or the like that correlate with higher confidence metrics (e.g., that are most effective in predicting results with high confidence). The predictive correlation module 318 may cooperate with, be integrated with, or otherwise work in concert with the feature selector module 302 to determine one or more features, instances of features, or the like that correlate with higher confidence metrics. For example, as the feature selector module 302 causes the predictive compiler module 206 to generate and evaluate learned functions with different sets of features, the predictive correlation module 318 may determine which features and/or instances of features correlate with higher confidence metrics, are most effective, or the like based on metadata from the metadata library 314.

The predictive correlation module 318, in certain embodiments, is configured to harvest metadata regarding which features correlate to higher confidence metrics, to determine which feature was predictive of which outcome or result, or the like. In one embodiment, the predictive correlation module 318 determines the relationship of a feature's predictive qualities for a specific outcome or result based on each instance of a particular feature. In other embodiments, the predictive correlation module 318 may determine the relationship of a feature's predictive qualities based on a subset of instances of a particular feature. For example, the predictive correlation module 318 may discover a correlation between one or more features and the confidence metric of a predicted result by attempting different combinations of features and subsets of instances within an individual feature's dataset, and measuring an overall impact on predictive quality, accuracy, confidence, or the like. The predictive correlation module 318 may determine predictive features at various granularities, such as per feature, per subset of features, per instance, or the like.

In one embodiment, the predictive correlation module 318 determines one or more features with a greatest contribution to a predicted result or confidence metric as the predictive compiler module 206 forms the predictive ensemble 304, based on evaluation metadata from the metadata library 314, or the like. For example, the predictive compiler module 206 may build one or more synthesized learned functions 324 that are configured to provide one or more features with a greatest contribution as part of a result. In another embodiment, the predictive correlation module 318 may determine one or more features with a greatest contribution to a predicted result or confidence metric dynamically at runtime as the predictive ensemble 304 determines the predicted result or confidence metric. In such embodiments, the predictive correlation module 318 may be part of, integrated with, or in communication with the predictive ensemble 304. The predictive correlation module 318 may cooperate with the predictive ensemble 304, such that the predictive ensemble 304 provides a listing of one or more features that provided a greatest contribution to a predicted result or confidence metric as part of a response to an analysis request.

In determining features that are predictive, or that have a greatest contribution to a predicted result or confidence metric, the predictive correlation module 318 may balance a frequency of the contribution of a feature and/or an impact of the contribution of the feature. For example, a certain feature or set of features may contribute to the predicted result or confidence metric frequently, for each instance or the like, but have a low impact. Another feature or set of features may contribute relatively infrequently, but has a very high impact on the predicted result or confidence metric (e.g. provides at or near 100% confidence or the like). While the predictive correlation module 318 is described herein as determining features that are predictive or that have a greatest contribution, in other embodiments, the predictive correlation module 318 may determine one or more specific instances of a feature that are predictive, have a greatest contribution to a predicted result or confidence metric, or the like.

In the depicted embodiment, the predictive compiler module 206 includes a combiner module 306. The combiner module 306 combines learned functions, forming sets, strings, groups, trees, or clusters of combined learned functions. In certain embodiments, the combiner module 306 combines learned functions into a prescribed order, and different orders of learned functions may have different inputs, produce different results, or the like. The combiner module 306 may combine learned functions in different combinations. For example, the combiner module 306 may combine certain learned functions horizontally or in parallel, joined at the inputs and at the outputs or the like, and may combine certain learned functions vertically or in series, feeding the output of one learned function into the input of another learned function.

The combiner module 306 may determine which learned functions to combine, how to combine learned functions, or the like based on evaluation metadata for the learned functions from the metadata library 314, generated based on an evaluation of the learned functions using test data, as described below with regard to the function evaluator module 312. The combiner module 306 may request additional learned functions from the function generator module 204, for combining with other learned functions. For example, the combiner module 306 may request a new learned function with a particular input and/or output to combine with an existing learned function, or the like.

While the combining of learned functions may be informed by evaluation metadata for the learned functions, in certain embodiments, the combiner module 306 combines a large number of learned functions pseudo-randomly, forming a large number of combined functions. For example, the combiner module 306, in one embodiment, may determine each possible combination of generated learned functions, as many combinations of generated learned functions as possible given one or more limitations or constraints, a selected subset of combinations of generated learned functions, or the like, for evaluation by the function evaluator module 312. In certain embodiments, by generating a large number of combined learned functions, the combiner module 306 is statistically likely to form one or more combined learned functions that are useful and/or effective for the training data.

In the depicted embodiment, the predictive compiler module 206 includes an extender module 308. The extender module 308, in certain embodiments, is configured to add one or more layers to a learned function. For example, the extender module 308 may extend a learned function or combined learned function by adding a probabilistic model layer, such as a Bayesian belief network layer, a Bayes classifier layer, a Boltzmann layer, or the like.

Certain classes of learned functions, such as probabilistic models, may be configured to receive either instances of one or more features as input, or the output results of other learned functions, such as a classification and a confidence metric, an inferred function, a regression function, an answer, a prediction, a recognized pattern, a rule, a recommendation, or the like. The extender module 308 may use these types of learned functions to extend other learned functions. The extender module 308 may extend learned functions generated by the function generator module 204 directly, may extend combined learned functions from the combiner module 306, may extend other extended learned functions, may extend synthesized learned functions from the synthesizer module 310, or the like.

In one embodiment, the extender module 308 determines which learned functions to extend, how to extend learned functions, or the like based on evaluation metadata from the metadata library 314. The extender module 308, in certain embodiments, may request one or more additional learned functions from the function generator module 204 and/or one or more additional combined learned functions from the combiner module 306, for the extender module 308 to extend.

While the extending of learned functions may be informed by evaluation metadata for the learned functions, in certain embodiments, the extender module 308 generates a large number of extended learned functions pseudo-randomly. For example, the extender module 308, in one embodiment, may extend each possible learned function and/or combination of learned functions, may extend a selected subset of learned functions, may extend as many learned functions as possible given one or more limitations or constraints, or the like, for evaluation by the function evaluator module 312. In certain embodiments, by generating a large number of extended learned functions, the extender module 308 is statistically likely to form one or more extended learned functions and/or combined extended learned functions that are useful and/or effective for the training data.

In the depicted embodiment, the predictive compiler module 206 includes a synthesizer module 310. The synthesizer module 310, in certain embodiments, is configured to organize a subset of learned functions into the predictive ensemble 304, as synthesized learned functions 324. In a further embodiment, the synthesizer module 310 includes evaluation metadata from the metadata library 314 of the function evaluator module 312 in the predictive ensemble 304 as a synthesized metadata rule set 322, so that the predictive ensemble 304 includes synthesized learned functions 324 and evaluation metadata, the synthesized metadata rule set 322, for the synthesized learned functions 324.

The learned functions that the synthesizer module 310 synthesizes or organizes into the synthesized learned functions 324 of the predictive ensemble 304, may include learned functions directly from the function generator module 204, combined learned functions from the combiner module 306, extended learned functions from the extender module 308, combined extended learned functions, or the like. As described below, in one embodiment, the function selector module 316 selects the learned functions for the synthesizer module 310 to include in the predictive ensemble 304. In certain embodiments, the synthesizer module 310 organizes learned functions by preparing the learned functions and the associated evaluation metadata for processing workload data to reach a result. For example, as described below, the synthesizer module 310 may organize and/or synthesize the synthesized learned functions 324 and the synthesized metadata rule set 322 for the orchestration module 320 to use to direct workload data through the synthesized learned functions 324 to produce a result.

In one embodiment, the function evaluator module 312 evaluates the synthesized learned functions 324 that the synthesizer module 310 organizes, and the synthesizer module 310 synthesizes and/or organizes the synthesized metadata rule set 322 based on evaluation metadata that the function evaluation module 312 generates during the evaluation of the synthesized learned functions 324, from the metadata library 314 or the like.

In the depicted embodiment, the predictive compiler module 206 includes a function evaluator module 312. The function evaluator module 312 is configured to evaluate learned functions using test data, or the like. The function evaluator module 312 may evaluate learned functions generated by the function generator module 204, learned functions combined by the combiner module 306 described above, learned functions extended by the extender module 308 described above, combined extended learned functions, synthesized learned functions 324 organized into the predictive ensemble 304 by the synthesizer module 310 described above, or the like.

Test data for a learned function, in certain embodiments, comprises a different subset of the initialization data for the learned function than the function generator module 204 used as training data. The function evaluator module 312, in one embodiment, evaluates a learned function by inputting the test data into the learned function to produce a result, such as a classification, a confidence metric, an inferred function, a regression function, an answer, a prediction, a recognized pattern, a rule, a recommendation, or another result.

Test data, in certain embodiments, comprises a subset of initialization data, with a feature associated with the requested result removed, so that the function evaluator module 312 may compare the result from the learned function to the instances of the removed feature to determine the accuracy and/or effectiveness of the learned function for each test instance. For example, if a client 104 has requested a predictive ensemble 304 to predict whether a customer will be a repeat customer, and provided historical customer information as initialization data, the function evaluator module 312 may input a test data set comprising one or more features of the initialization data other than whether the customer was a repeat customer into the learned function, and compare the resulting predictions to the initialization data to determine the accuracy and/or effectiveness of the learned function.

The function evaluator module 312, in one embodiment, is configured to maintain evaluation metadata for an evaluated learned function in the metadata library 314. The evaluation metadata, in certain embodiments, comprises log data generated by the function generator module 204 while generating learned functions, the function evaluator module 312 while evaluating learned functions, or the like.

In one embodiment, the evaluation metadata includes indicators of one or more training data sets that the function generator module 204 used to generate a learned function. The evaluation metadata, in another embodiment, includes indicators of one or more test data sets that the function evaluator module 312 used to evaluate a learned function. In a further embodiment, the evaluation metadata includes indicators of one or more decisions made by and/or branches taken by a learned function during an evaluation by the function evaluator module 312. The evaluation metadata, in another embodiment, includes the results determined by a learned function during an evaluation by the function evaluator module 312. In one embodiment, the evaluation metadata may include evaluation metrics, learning metrics, effectiveness metrics, convergence metrics, or the like for a learned function based on an evaluation of the learned function. An evaluation metric, learning metrics, effectiveness metric, convergence metric, or the like may be based on a comparison of the results from a learned function to actual values from initialization data, and may be represented by a correctness indicator for each evaluated instance, a percentage, a ratio, or the like. Different classes of learned functions, in certain embodiments, may have different types of evaluation metadata.

The metadata library 314, in one embodiment, provides evaluation metadata for learned functions to the feature selector module 302, the predictive correlation module 318, the combiner module 306, the extender module 308, and/or the synthesizer module 310. The metadata library 314 may provide an API, a shared library, one or more function calls, or the like providing access to evaluation metadata. The metadata library 314, in various embodiments, may store or maintain evaluation metadata in a database format, as one or more flat files, as one or more lookup tables, as a sequential log or log file, or as one or more other data structures. In one embodiment, the metadata library 314 may index evaluation metadata by learned function, by feature, by instance, by training data, by test data, by effectiveness, and/or by another category or attribute and may provide query access to the indexed evaluation metadata. The function evaluator module 312 may update the metadata library 314 in response to each evaluation of a learned function, adding evaluation metadata to the metadata library 314 or the like.

The function selector module 316, in certain embodiments, may use evaluation metadata from the metadata library 314 to select learned functions for the combiner module 306 to combine, for the extender module 308 to extend, for the synthesizer module 310 to include in the predictive ensemble 304, or the like. For example, in one embodiment, the function selector module 316 may select learned functions based on evaluation metrics, learning metrics, effectiveness metrics, convergence metrics, or the like. In another embodiment, the function selector module 316 may select learned functions for the combiner module 306 to combine and/or for the extender module 308 to extend based on features of training data used to generate the learned functions, or the like.

The predictive ensemble 304, in certain embodiments, provides predictive results for an analysis request by processing workload data of the analysis request using a plurality of learned functions (e.g., the synthesized learned functions 324). As described above, results from the predictive ensemble 304, in various embodiments, may include a classification, a confidence metric, an inferred function, a regression function, an answer, a prediction, a recognized pattern, a rule, a recommendation, and/or another result. For example, in one embodiment, the predictive ensemble 304 provides a classification and a confidence metric for each instance of workload data input into the predictive ensemble 304, or the like. Workload data, in certain embodiments, may be substantially similar to test data, but the missing feature from the initialization data is not known, and is to be solved for by the predictive ensemble 304. A classification, in certain embodiments, comprises a value for a missing feature in an instance of workload data, such as a prediction, an answer, or the like. For example, if the missing feature represents a question, the classification may represent a predicted answer, and the associated confidence metric may be an estimated strength or accuracy of the predicted answer. A classification, in certain embodiments, may comprise a binary value (e.g., yes or no), a rating on a scale (e.g., 4 on a scale of 1 to 5), or another data type for a feature. A confidence metric, in certain embodiments, may comprise a percentage, a ratio, a rating on a scale, or another indicator of accuracy, effectiveness, and/or confidence.

In the depicted embodiment, the predictive ensemble 304 includes an orchestration module 320. The orchestration module 320, in certain embodiments, is configured to direct workload data through the predictive ensemble 304 to produce a result, such as a classification, a confidence metric, an inferred function, a regression function, an answer, a prediction, a recognized pattern, a rule, a recommendation, and/or another result. In one embodiment, the orchestration module 320 uses evaluation metadata from the function evaluator module 312 and/or the metadata library 314, such as the synthesized metadata rule set 322, to determine how to direct workload data through the synthesized learned functions 324 of the predictive ensemble 304. As described below with regard to FIG. 8, in certain embodiments, the synthesized metadata rule set 322 comprises a set of rules or conditions from the evaluation metadata of the metadata library 314 that indicate to the orchestration module 320 which features, instances, or the like should be directed to which synthesized learned function 324.

For example, the evaluation metadata from the metadata library 314 may indicate which learned functions were trained using which features and/or instances, how effective different learned functions were at making predictions based on different features and/or instances, or the like. The synthesizer module 310 may use that evaluation metadata to determine rules for the synthesized metadata rule set 322, indicating which features, which instances, or the like the orchestration module 320 the orchestration module 320 should direct through which learned functions, in which order, or the like. The synthesized metadata rule set 322, in one embodiment, may comprise a decision tree or other data structure comprising rules which the orchestration module 320 may follow to direct workload data through the synthesized learned functions 324 of the predictive ensemble 304.

Figure 4:
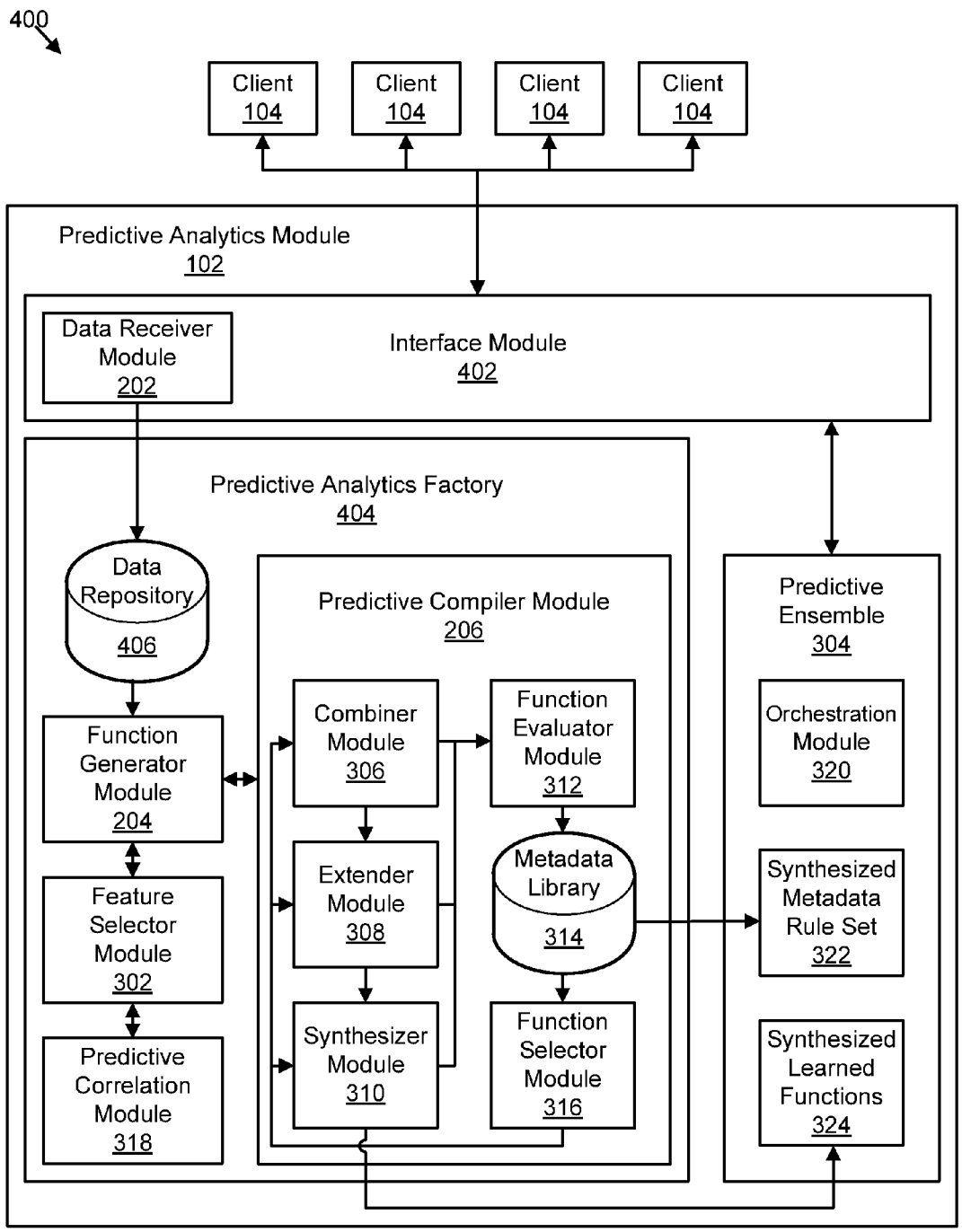
FIG. 4 is a schematic block diagram illustrating another embodiment of a system for a predictive analytics factory.

FIG. 4 depicts one embodiment of a system 400 for a predictive analytics factory. The system 400, in the depicted embodiment, includes several clients 104 in communication with a predictive analytics module 102 over a data network 106, substantially as described above with regard to FIG. 1. The predictive analytics module 102 of FIG. 4 is substantially similar to the predictive analytics module 102 of FIG. 3, but further includes an interface module 402, a predictive analytics factory 404, and a data repository 406.

The interface module 312, in certain embodiments, is configured to receive requests from clients 104, to provide results to a client 104, or the like. The interface module 312 may provide a predictive analytics interface to clients 104, such as an API, a shared library, a hardware command interface, or the like, over which clients 104 may make requests and receive results. The interface module 312 may support new ensemble requests from clients 104, allowing clients 104 to request generation of a new predictive ensemble from the predictive analytics factory 404 or the like. As described above, a new ensemble request may include initialization data; one or more ensemble parameters; a feature, query, question or the like for which a client 104 would like a predictive ensemble 304 to predict a result; or the like. The interface module 312 may support analysis requests for a result from a predictive ensemble 304. As described above, an analysis request may include workload data; a feature, query, question or the like; a predictive ensemble 304; or may include other analysis parameters.

In certain embodiments, the predictive analytics module 102 may maintain a library of generated predictive ensembles 304, from which clients 104 may request results. In such embodiments, the interface module 402 may return a reference, pointer, or other identifier of the requested predictive ensemble 304 to the requesting client 104, which the client 104 may use in analysis requests. In another embodiment, in response to the predictive analytics factory 404 generating a predictive ensemble 304 to satisfy a new ensemble request, the interface module 402 may return the actual predictive ensemble 304 to the client 104, for the client 104 to manage, and the client 104 may include the predictive ensemble 304 in each analysis request.

The interface module 312 may cooperate with the predictive analytics factory 404 to service new ensemble requests, may cooperate with the predictive ensemble 304 to provide a result to an analysis request, or the like. The predictive analytics factory 404, in the depicted embodiment, includes the function generator module 204, the feature selector module 302, the predictive correlation module 318, and the predictive compiler module 206, as described above. The predictive analytics factory 404, in the depicted embodiment, also includes a data repository 406.

The data repository 406, in one embodiment, stores initialization data, so that the function generator module 204, the feature selector module 302, the predictive correlation module 318, and/or the predictive compiler module 206 may access the initialization data to generate, combine, extend, evaluate, and/or synthesize learned functions and predictive ensembles 304. The data repository 406 may provide initialization data indexed by feature, by instance, by training data subset, by test data subset, by new ensemble request, or the like. By maintaining initialization data in a data repository 406, in certain embodiments, the predictive analytics factory 404 ensures that the initialization data is accessible throughout the predictive ensemble 304 building process, for the function generator module 204 to generate learned functions, for the feature selector module 302 to determine which features should be used in the predictive ensemble 304, for the predictive correlation module 318 to determine which features correlate with the highest confidence metrics, for the combiner module 306 to combine learned functions, for the extender module 308 to extend learned functions, for the function evaluator module 312 to evaluate learned functions, for the synthesizer module 310 to synthesize learned functions 324 and/or metadata rule sets 322, or the like.

In the depicted embodiment, the data receiver module 202 is integrated with the interface module 402, to receive initialization data, including training data and test data, from new ensemble requests. The data receiver module 202 stores initialization data in the data repository 406. The function generator module 204 is in communication with the data repository 406, in one embodiment, so that the function generator module 204 may generate learned functions based on training data sets from the data repository 406. The feature selector module 202 and/or the predictive correlation module 318, in certain embodiments, may cooperate with the function generator module 204 and/or the predictive compiler module 206 to determine which features to use in the predictive ensemble 204, which features are most predictive or correlate with the highest confidence metrics, or the like.

Within the predictive compiler module 206, the combiner module 306, the extender module 308, and the synthesizer module 310 are each in communication with both the function generator module 204 and the function evaluator module 312. The function generator module 204, as described above, may generate an initial large amount of learned functions, from different classes or the like, which the function evaluator module 312 evaluates using test data sets from the data repository 406. The combiner module 306 may combine different learned functions from the function generator module 204 to form combined learned functions, which the function evaluator module 312 evaluates using test data from the data repository 406. The combiner module 306 may also request additional learned functions from the function generator module 204.

The extender module 308, in one embodiment, extends learned functions from the function generator module 204 and/or the combiner module 306. The extender module 308 may also request additional learned functions from the function generator module 204. The function evaluator module 312 evaluates the extended learned functions using test data sets from the data repository 406. The synthesizer module 310 organizes, combines, or otherwise synthesizes learned functions from the function generator module 204, the combiner module 306, and/or the extender module 308 into synthesized learned functions 324 for the predictive ensemble 304. The function evaluator module 312 evaluates the synthesized learned functions 324, and the synthesizer module 310 organizes or synthesizes the evaluation metadata from the metadata library 314 into a synthesized metadata rule set 322 for the synthesized learned functions 324.

As described above, as the function evaluator module 312 evaluates learned functions from the function generator module 204, the combiner module 306, the extender module 308, and/or the synthesizer module 310, the function evaluator module 312 generates evaluation metadata for the learned functions and stores the evaluation metadata in the metadata library 314. In the depicted embodiment, in response to an evaluation by the function evaluator module 312, the function selector module 316 selects one or more learned functions based on evaluation metadata from the metadata library 314. For example, the function selector module 316 may select learned functions for the combiner module 306 to combine, for the extender module 308 to extend, for the synthesizer module 310 to synthesize, or the like.

Figure 5:
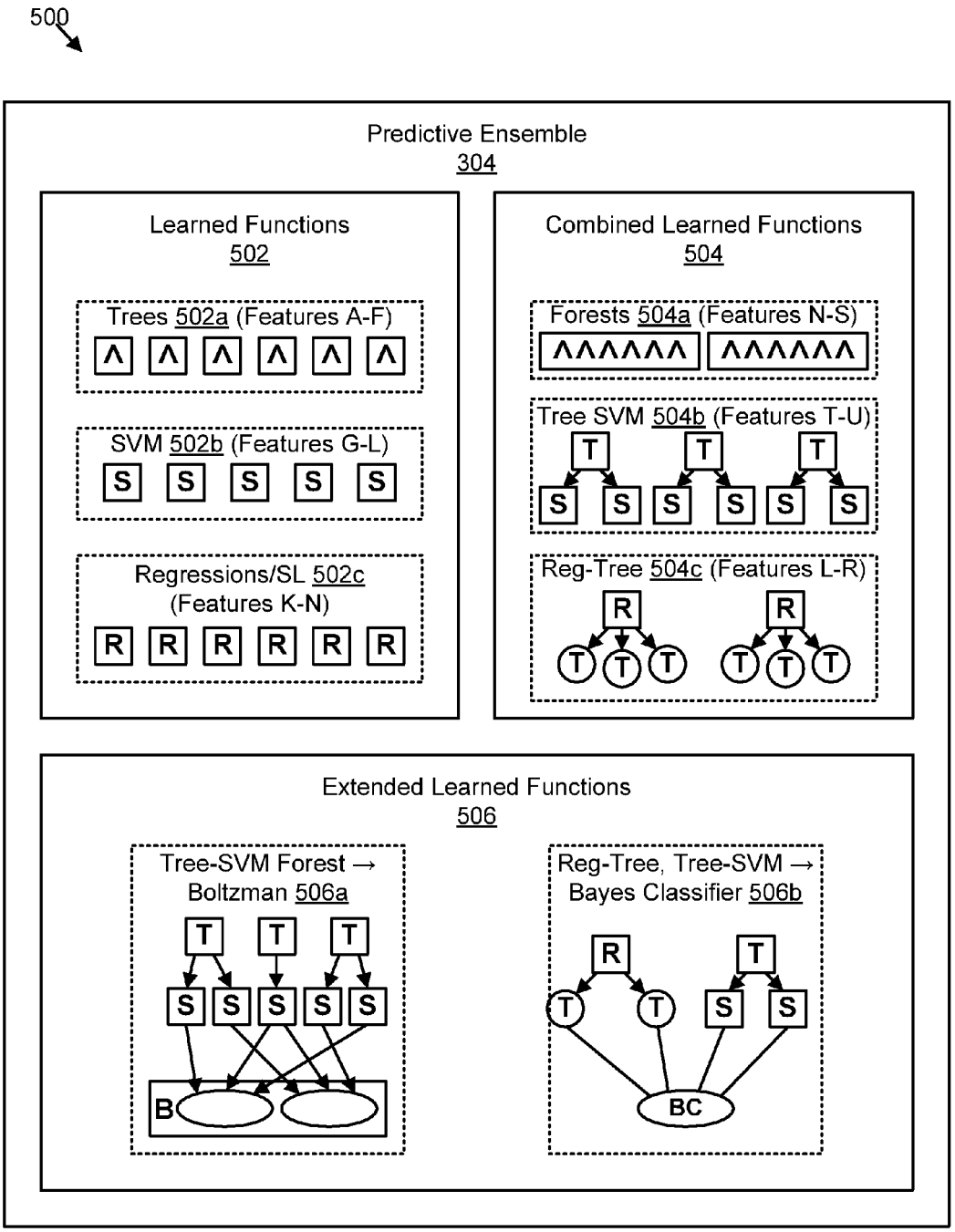
FIG. 5 is a schematic block diagram illustrating one embodiment of learned functions for a predictive ensemble.

FIG. 5 depicts one embodiment 500 of learned functions 502, 504, 506 for a predictive ensemble 304. The learned functions 502, 504, 506 are presented by way of example, and in other embodiments, other types and combinations of learned functions may be used, as described above. Further, in other embodiments, the predictive ensemble 204 may include an orchestration module 320, a synthesized metadata rule set 322, or the like. In one embodiment, the function generator module 204 generates the learned functions 502. The learned functions 502, in the depicted embodiment, include various collections of selected learned functions 502 from different classes including a collection of decision trees 502a, configured to receive or process a subset A-F of the feature set of the predictive ensemble 304, a collection of support vector machines ("SVMs") 502b with certain kernels and with an input space configured with particular subsets of the feature set G-L, and a selected group of regression models 502c, here depicted as a suite of single layer ("SL") neural nets trained on certain feature sets K-N.

The example combined learned functions 504, combined by the combiner module 306 or the like, include various instances of forests of decision trees 504a configured to receive or process features N-S, a collection of combined trees with support vector machine decision nodes 504b with specific kernels, their parameters and the features used to define the input space of features T-U, as well as combined functions 504c in the form of trees with a regression decision at the root and linear, tree node decisions at the leaves, configured to receive or process features L-R.

Component class extended learned functions 506, extended by the extender module 308 or the like, include a set of extended functions such as a forest of trees 506a with tree decisions at the roots and various margin classifiers along the branches, which have been extended with a layer of Boltzmann type Bayesian probabilistic classifiers. Extended learned function 506b includes a tree with various regression decisions at the roots, a combination of standard tree 504b and regression decision tree 504c and the branches are extended by a Bayes classifier layer trained with a particular training set exclusive of those used to train the nodes.

Figure 6:
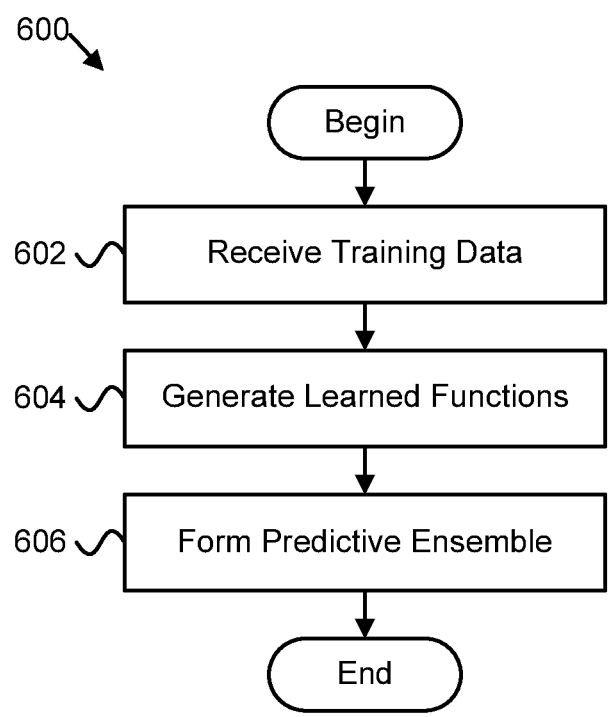
FIG. 6 is a schematic flow chart diagram illustrating one embodiment of a method for a predictive analytics factory.

FIG. 6 depicts one embodiment of a method 600 for a predictive analytics factory. The method 600 begins, and the data receiver module 202 receives 602 training data. The function generator module 204 generates 604 a plurality of learned functions from multiple classes based on the received 602 training data. The predictive compiler module 206 forms 606 a predictive ensemble comprising a subset of learned functions from at least two classes, and the method 600 ends.

Figure 7:
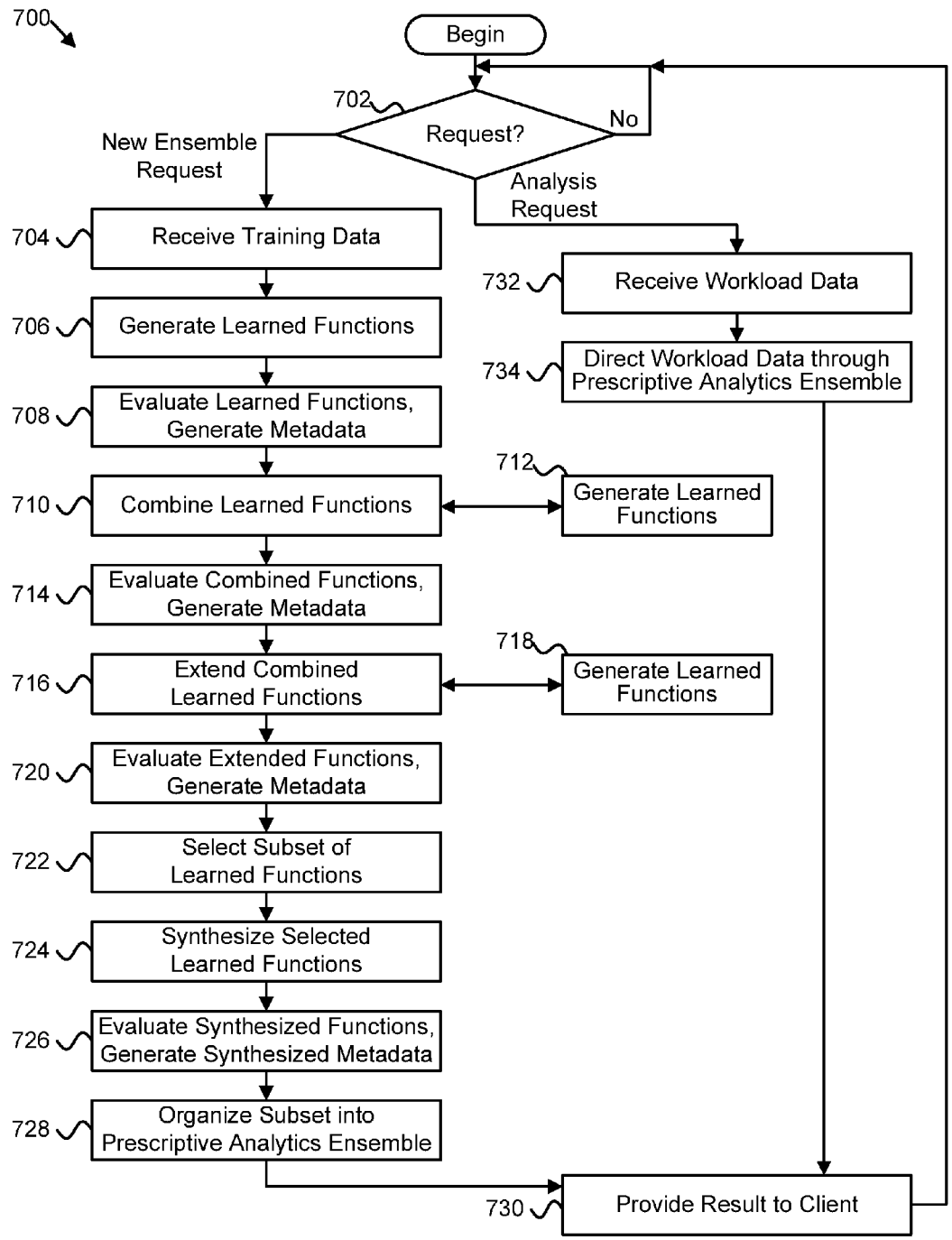
FIG. 7 is a schematic flow chart diagram illustrating another embodiment of a method for a predictive analytics factory.

FIG. 7 depicts another embodiment of a method 700 for a predictive analytics factory. The method 700 begins, and the interface module 402 monitors 702 requests until the interface module 402 receives 702 an analytics request from a client 104 or the like.

If the interface module 402 receives 702 a new ensemble request, the data receiver module 202 receives 704 training data for the new ensemble, as initialization data or the like. The function generator module 204 generates 706 a plurality of learned functions based on the received 704 training data, from different predictive analytics classes. The function evaluator module 312 evaluates 708 the plurality of generated 706 learned functions to generate evaluation metadata. The combiner module 306 combines 710 learned functions based on the metadata from the evaluation 708. The combiner module 306 may request that the function generator module 204 generate 712 additional learned functions for the combiner module 306 to combine.

The function evaluator module 312 evaluates 714 the combined 710 learned functions and generates additional evaluation metadata. The extender module 308 extends 716 one or more learned functions by adding one or more layers to the one or more learned functions, such as a probabilistic model layer or the like. In certain embodiments, the extender module 308 extends 716 combined 710 learned functions based on the evaluation 712 of the combined learned functions. The extender module 308 may request that the function generator module 204 generate 718 additional learned functions for the extender module 308 to extend. The function evaluator module 312 evaluates 720 the extended 716 learned functions. The function selector module 316 selects 722 at least two learned functions, such as the generated 706 learned functions, the combined 710 learned functions, the extended 716 learned functions, or the like, based on evaluation metadata from one or more of the evaluations 708, 714, 720.

The synthesizer module 310 synthesizes 724 the selected 722 learned functions into synthesized learned functions 324. The function evaluator module 312 evaluates 726 the synthesized learned functions 324 to generate a synthesized metadata rule set 322. The synthesizer module 310 organizes 728 the synthesized 724 learned functions 324 and the synthesized metadata rule set 322 into a predictive ensemble 304. The interface module 402 provides 730 a result to the requesting client 104, such as the predictive ensemble, a reference to the predictive ensemble, an acknowledgment, or the like, and the interface module 402 continues to monitor 702 requests.

If the interface module 402 receives 702 an analysis request, the data receiver module 202 receives 732 workload data associated with the analysis request. The orchestration module 320 directs 734 the workload data through a predictive ensemble 304 associated with the received 702 analysis request to produce a result, such as a classification, a confidence metric, an inferred function, a regression function, an answer, a prediction, a recognized pattern, a rule, a recommendation, and/or another result. The interface module 402 provides 730 the produced result to the requesting client 104, and the interface module 402 continues to monitor 702 requests.

Figure 8:
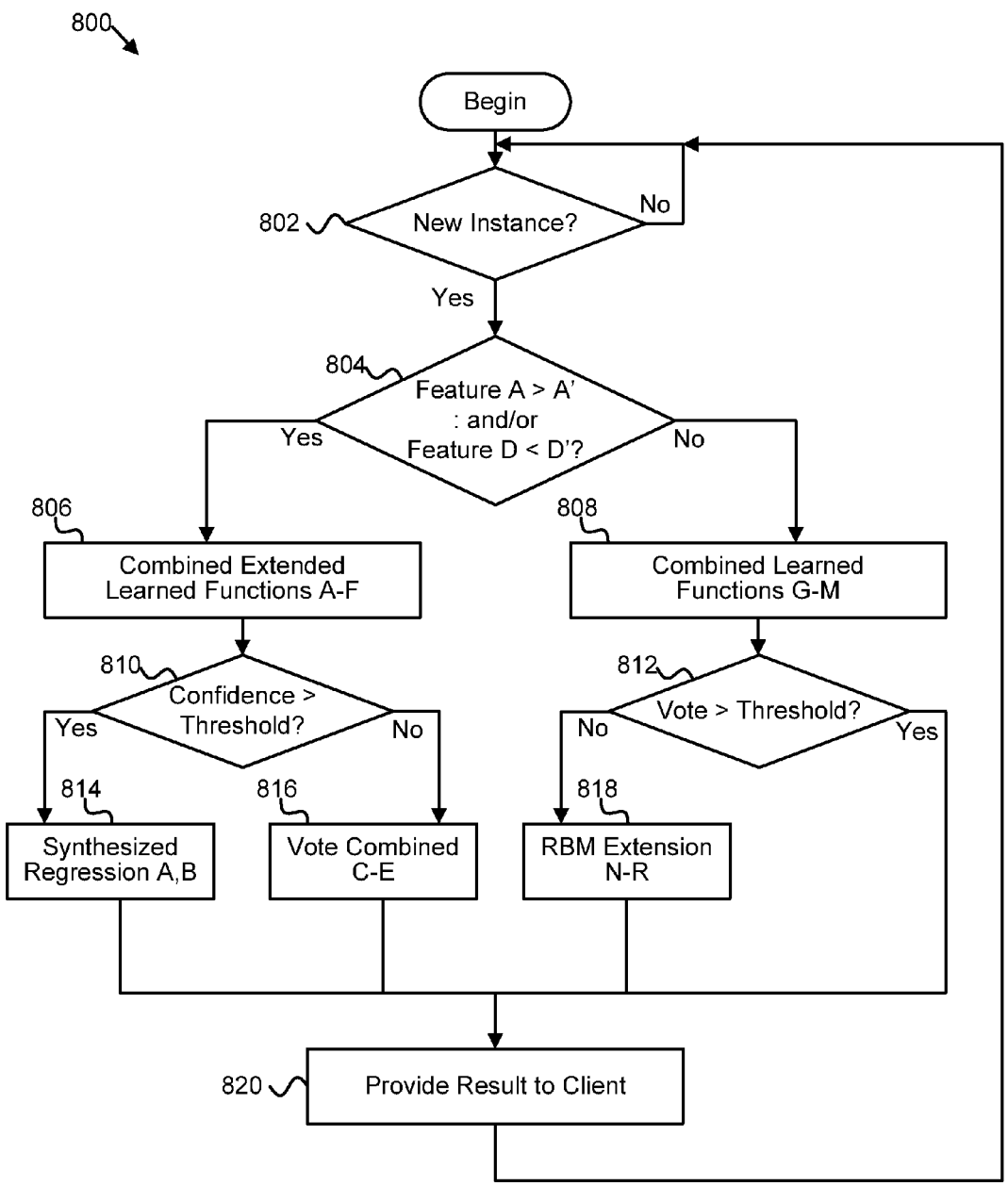
FIG. 8 is a schematic flow chart diagram illustrating one embodiment of a method for directing data through a predictive ensemble.

FIG. 8 depicts one embodiment of a method 800 for directing data through a predictive ensemble. The specific synthesized metadata rule set 322 of the depicted method 800 is presented by way of example only, and many other rules and rule sets may be used.

A new instance of workload data is presented 802 to the predictive ensemble 304 through the interface module 402. The data is processed through the data receiver module 202 and configured for the particular analysis request as initiated by a client 104. In this embodiment the orchestration module 320 evaluates a certain set of features associates with the data instance against a set of thresholds contained within the synthesized metadata rule set 322.

A binary decision 804 passes the instance to, in one case, a certain combined and extended function 806 configured for features A-F or in the other case a different, parallel combined function 808 configured to predict against a feature set G-M. In the first case 806, if the output confidence passes 810 a certain threshold as given by the meta-data rule set the instance is passed to a synthesized, extended regression function 814 for final evaluation, else the instance is passed to a combined collection 816 whose output is a weighted voted based processing a certain set of features. In the second case 808 a different combined function 812 with a simple vote output results in the instance being evaluated by a set of base learned functions extended by a Boltzmann type extension 818 or, if a prescribed threshold is meet the output of the synthesized function is the simple vote. The interface module 402 provides 820 the result of the orchestration module directing workload data through the predictive ensemble 304 to a requesting client 104 and the method 800 continues.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for a predictive analytics factory, the apparatus comprising:
  a receiver module configured to receive training data for forming a predictive ensemble customized for the training data;
  a function generator module configured to pseudo-randomly generate a plurality of learned functions based on the training data without prior knowledge regarding suitability of the generated learned functions for the training data;
  a function evaluator module configured to perform an evaluation of the plurality of learned functions using test data and to maintain evaluation metadata for the plurality of learned functions, the evaluation metadata comprising one or more of an indicator of a training data set used to generate a learned function and an indicator of one or more decisions made by a learned function during the evaluation; and a predictive compiler module configured to form the predictive ensemble, the predictive ensemble comprising a subset of multiple learned functions from the plurality of learned functions, the multiple learned functions selected and combined based on the evaluation metadata for the plurality of learned functions, the predictive ensemble comprising a rule set synthesized from the evaluation metadata to direct data through the multiple learned functions such that different learned functions of the ensemble process different subsets of the data based on the evaluation metadata.

2. The apparatus of claim 1, further comprising a feature selector module configured to, in response to the function generator module determining the plurality of learned functions, determine a subset of features from the training data for use in the predictive ensemble based on the evaluation metadata, the predictive compiler module configured to form the predictive ensemble using the selected subset of features.

3. The apparatus of claim 2, wherein the feature selector module is configured to iteratively increase a size of the subset of features until a subsequent increase in the size fails to satisfy a feature effectiveness threshold.

4. The apparatus of claim 2, wherein one or more of the features of the training data are selected by a user as required and the feature selector module is configured to select one or more optional features to include in the subset of features with the required one or more features.

5. The apparatus of claim 1, wherein the function evaluator module is configured to perform the evaluation of the plurality of learned functions using test data by inputting the test data into the plurality of learned functions to output the one or more decisions.

6. The apparatus of claim 5, wherein the function evaluator module is configured to maintain the evaluation metadata for each evaluated learned function in a metadata library, the predictive compiler module configured to include the rule set in the predictive ensemble, the rule set comprising at least a portion of the evaluation metadata.

7. The apparatus of claim 6, wherein the evaluation metadata further comprises one or more of the training data, classification metadata, convergence metrics, and efficacy metrics for the plurality of learned functions.

8. The apparatus of claim 1, wherein the predictive compiler module is configured to combine learned functions from the plurality of learned functions to form combined learned functions, the predictive ensemble comprising at least one combined learned function.

9. The apparatus of claim 8, wherein the function generator module is configured to determine one or more additional learned functions in response to a learned function request, the predictive compiler module configured to request one or more additional learned functions from the function generator to combine with learned functions from the plurality of learned functions.

10. The apparatus of claim 1, wherein the predictive compiler module is configured to add one or more layers to at least a portion of the plurality of learned functions to form one or more extended learned functions, at least one of the one or more layers comprising a probabilistic model, the predictive ensemble comprising at least one extended learned function.

11. The apparatus of claim 1, wherein the predictive compiler is configured to form the predictive ensemble by organizing the subset of learned functions into the predictive ensemble, the predictive ensemble comprising the subset of learned functions and the rule set synthesized from the evaluation metadata for the subset of learned functions.

12. The apparatus of claim 1, further comprising an orchestration module configured to direct workload data through the predictive ensemble based on the evaluation metadata data to produce a classification for the workload data and a confidence metric for the classification, the evaluation metadata synthesized to form the rule set for the subset of learned functions.

13. The apparatus of claim 1, further comprising an interface module configured to receive an analytics request from a client and to provide an analytics result to the client, the analytics request comprising workload data with similar features to the training data, the analytics result produced by the predictive ensemble.

14. A method for a predictive analysis factory, the method comprising:
   pseudo-randomly generating a plurality of learned functions based on training data without prior knowledge regarding suitability of the generated learned functions for the training data, the training data received for forming a predictive ensemble customized for the training data;
   evaluating the plurality of learned functions using test data to generate evaluation metadata indicating an effectiveness of different learned functions at making predictions based on different subsets of the test data; and
   forming the predictive ensemble comprising a subset of multiple learned functions from the plurality of learned functions, the subset of multiple learned functions selected and combined based on the evaluation metadata, the predictive ensemble comprising a rule set synthesized from the evaluation metadata to direct different subsets of the workload data through different learned functions of the multiple learned functions based on the evaluation metadata.

15. The method of claim 14, further comprising synthesizing the evaluation metadata into a rule set for the subset of learned functions, wherein forming the predictive ensemble further comprises including the rule set in the predictive ensemble.

16. The method of claim 14, wherein forming the predictive ensemble comprises one or more of:
   combining learned functions from the plurality of learned functions to form a combined learned function; and
   adding one or more layers to a learned function from the plurality of learned functions to form an extended learned function.

17. A computer program product comprising a non-transitory computer readable storage medium storing computer usable program code executable to perform operations for a predictive analysis factory, the operations comprising:
   pseudo-randomly determining a plurality of learned functions using training data without prior knowledge regarding suitability of the determined learned functions for the training data, the training data comprising a plurality of features, the training data received for forming a predictive ensemble customized for the training data;
   selecting a subset of the features of the training data based on evaluation metadata generated for the plurality of learned functions, the evaluation metadata comprising an effectiveness metric for a learned function; and forming the predictive ensemble, the predictive ensemble comprising at least two learned functions from the plurality of learned functions, the at least two learned functions using the selected subset of features, the at least two learned functions selected and combined based on the evaluation metadata, the predictive ensemble comprising a rule set synthesized from the evaluation metadata to direct data through the at least two learned functions so that different learned functions process different features of the selected subset of features.

18. The computer program product of claim 17, wherein the operations further comprise evaluating the plurality of learned functions using test data to generate the evaluation metadata.

19. The computer program product of claim 18, wherein evaluating the plurality of learned functions comprises generating a predictive ensemble for each possible combination of features of the training data and evaluating each generated predictive ensemble using the test data.

20. The computer program product of claim 17, wherein the operations further comprise iteratively increasing a size of the subset of features until a subsequent increase in the size fails to satisfy a feature effectiveness threshold.

21. The computer program product of claim 17, wherein the operations further comprise identifying one or more of the plurality of features as noisy and excluding the noisy features from the selected subset of features.

22. The computer program product of claim 17, wherein one or more of the features of the training data are selected by a user as required for inclusion in the subset of features.

23. A predictive analytics ensemble comprising:
multiple learned functions synthesized from a larger plurality of learned functions, the multiple learned functions selected and combined based on evaluation metadata for an evaluation of the larger plurality of learned functions, wherein the larger plurality of learned functions are generated pseudo-randomly from training data without prior knowledge of a suitability of the larger plurality of learned functions for the training data;
a metadata rule set synthesized from the evaluation metadata for the plurality of learned functions for directing data through different learned functions of the multiple learned functions to produce a result; and
an orchestration module configured to direct the data through the different learned functions of the multiple learned functions based on the synthesized metadata rule set to produce the result.

24. The predictive analytics ensemble of claim 23, further comprising a predictive correlation module configured to correlate one or more features of the multiple learned functions with a confidence metric associated with the result.

25. The predictive analytics ensemble of claim 24, wherein the predictive correlation module is configured to provide a listing of the one or more features correlated with the result to a client.

* * * * *